US009629022B2

United States Patent
Kazmi et al.

(10) Patent No.: US 9,629,022 B2
(45) Date of Patent: Apr. 18, 2017

(54) PROACTIVE ADMISSION CONTROL FOR MULTI-COVERAGE D2D COMMUNICATIONS

(71) Applicant: Telefonaktiebolaget L M Ericsson (publ), Stockholm (SE)

(72) Inventors: Muhammad Kazmi, Bromma (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 14/410,150

(22) PCT Filed: Nov. 5, 2014

(86) PCT No.: PCT/EP2014/073775
§ 371 (c)(1),
(2) Date: Dec. 22, 2014

(87) PCT Pub. No.: WO2016/070911
PCT Pub. Date: May 12, 2016

(65) Prior Publication Data
US 2016/0183121 A1    Jun. 23, 2016

(51) Int. Cl.
*H04W 28/18* (2009.01)
*H04W 76/02* (2009.01)
(Continued)

(52) U.S. Cl.
CPC ..... *H04W 28/0289* (2013.01); *H04L 41/0803* (2013.01); *H04L 41/12* (2013.01);
(Continued)

(58) Field of Classification Search
CPC . H04L 41/0803; H04L 41/12; H04L 41/5003; H04W 28/0289; H04W 28/18; H04W 76/023; H04W 88/04
See application file for complete search history.

(56) References Cited

U.S. PATENT DOCUMENTS

2008/0270619 A1    10/2008 Davies et al.
2010/0261469 A1    10/2010 Ribeiro et al.
(Continued)

FOREIGN PATENT DOCUMENTS

WO    WO 2006/016331    2/2006
WO    WO 2008/002298    1/2008
(Continued)

OTHER PUBLICATIONS

PCT Notification of Transmittal of the International Search Report and the Written Opinion of the International Searching Authority, or the Declaration for International application No. PCT/SE2013/051461, May 16, 2014.
(Continued)

*Primary Examiner* — Andrew Lai
*Assistant Examiner* — M Mostazir Rahman
(74) *Attorney, Agent, or Firm* — Baker Botts, LLP

(57) ABSTRACT

In some embodiments, a D2D capable wireless communication device receives parameters from a network node. The parameters comprise at least a first set of parameters indicating a configuration for use when the wireless communication device is in a first coverage scenario a second set of parameters indicating a configuration for use resources when the wireless communication device is in a second coverage scenario. The first coverage scenario is one of an in-network coverage (INC) scenario, a partial network coverage (PNC) scenario, or an out-of-network coverage (ONC) scenario. The second coverage scenario is a different one of the INC scenario, PNC scenario, or ONC scenario. The wireless communication device performs D2D operation in the first scenario based on the first set of parameters and in the second coverage scenario based on the second set of parameters.

22 Claims, 8 Drawing Sheets

(51) Int. Cl.
*H04W 28/02* (2009.01)
*H04L 12/24* (2006.01)
*H04W 88/04* (2009.01)

(52) U.S. Cl.
CPC ......... *H04L 41/5003* (2013.01); *H04W 28/18* (2013.01); *H04W 76/023* (2013.01); *H04W 88/04* (2013.01)

(56) References Cited

U.S. PATENT DOCUMENTS

| | | | |
|---|---|---|---|
| 2011/0199908 | A1 | 8/2011 | Dalsgaard et al. |
| 2011/0243261 | A1 | 10/2011 | Bienas et al. |
| 2011/0292915 | A1 | 12/2011 | Prakash et al. |
| 2013/0288668 | A1 | 10/2013 | Pragada et al. |
| 2014/0112194 | A1 | 4/2014 | Novlan et al. |

FOREIGN PATENT DOCUMENTS

| | | | |
|---|---|---|---|
| WO | WO 2011/149920 | A2 | 12/2011 |
| WO | WO 2012/008691 | A2 | 1/2012 |
| WO | WO 2012/022370 | A2 | 2/2012 |
| WO | WO 2013/172769 | A1 | 11/2013 |
| WO | WO 2013/177183 | | 11/2013 |

OTHER PUBLICATIONS

METIS: Seventh Framework Programme; Document No. ICT-317669-METIS/D1.1; Project Name: Mobile and wireless communications Enablers for the Twenty-twenty Information Society (METIS); Deliverable D1.1; Scenarios, requirements and KPIs for 5G mobile and wireless system, Apr. 29, 2013.

Source: General Dynamics Broadband UK: Title: Preconfigured Parameters for Out of Coverage Public Safety D2D Communication; 3GPP TSG-RAN2#84 (R2-134244), Nov. 11-15, 2013.

Source: General Dynamics UK Ltd; Title: Configuration of Parameters for D2D Communication; 3GPP TSG-RAN2#87 (R2-143093), Aug. 18-22, 2014.

Source: ITRI; Title: Admission control and pre-emption for ProSe UE-to-Network Relays; SA WG2 Meeting #105; SA WG2 Temporary Document (S2-143348), Oct. 13-17, 2014.

PCT Notification of Transmittal of the International Search Report and the Written Opinion of the International Searching Authority, or the Declaration for International application No. PCT/EP2014/073775, Jun. 29, 2015.

PROACTIVE ADMISSION CONTROL FOR MULTI-COVERAGE D2D COMMUNICATIONS

PRIORITY

This nonprovisional application is a U.S. National Stage Filing under 35 U.S.C. §371 of International Patent Application Serial No. PCT/EP2014/073775, filed Nov. 5, 2014, and entitled "Proactive Admission Control For Multi-Coverage D2D Communications."

TECHNICAL FIELD

Certain embodiments relate, in general, to wireless communications and, more particularly, to methods for proactive admission control for multi-coverage device-to-device (D2D) communications.

BACKGROUND

Device-to-Device (D2D) communication facilitates direct communication between wireless communication devices. In some scenarios, the wireless communication devices operate within a radio access network. In other scenarios, the wireless communication devices themselves constitute the radio access network. With the possibility for wireless communication devices to communicate using direct D2D communication, the wireless communication devices need not be required to communicate via an infrastructure node, such as a cellular base station or a wireless access point.

In cellular network assisted device-to-device communications (also called D2D communications as a cellular underlay), wireless communication devices in the vicinity of each other can establish a direct radio link (D2D bearer). While the wireless communication devices communicate over the D2D "direct" bearer, they also maintain a cellular connection with their respective serving network node, such as a base station or eNodeB (eNB).

D2D communication can be used by a D2D capable wireless communication device to offer one or more services to other D2D capable wireless communication devices. These services are sometimes referred to as proximity services (ProSe). A few non-limiting examples of such services include (1) public safety and disaster relief, which may also be known as national security and public safety (NSPS) or public warning systems (PWS), (2) relaying function, (3) social networking, and (4) cooperative positioning.

Public Warning Systems (PWS) refer to a range of technical solutions and standards that facilitate warning the public in case of a disaster or public safety situation, such as an earthquake or large accidents, which can be manmade, natural, or accidental. An example of PWS in 3GPP for cellular communication, for example, includes wireless system parts and communication protocols called Earthquake and Tsunami Warning System (ETWS) that specifically addresses disaster situations due to earthquake, tsunami, or other natural catastrophes.

Relaying function refers to a D2D wireless communication device (an intermediate device) acting as an intermediate node capable of forwarding information received from one D2D wireless communication device (a source device) to another D2D wireless communication device (a destination device). The intermediate device may relay the received information to the destination device either transparently or after decoding and analyzing the contents of the received message.

Social networking refers to services in which the wireless communication devices can send and/or receive a wide range of personal data or information such as email, text messages, face book, etc.

Cooperative positioning refers to D2D wireless communication devices that exchange positioning related data or signals with their peers. Thus, not all devices need to be able to receive positioning signals from satellite infrastructure and/or ground based infrastructure. For example, users in a Global Navigation Satellite System (GNSS)-hostile environment, such as an indoor environment, or users without GNSS capability receive aiding data from other nearby GNSS capable users capable of determining their own position and assisting others to determine their positions.

In evolving LTE-Advanced and 5G cellular networks, D2D communication is useful in supporting proximity services (ProSe). Both the 3rd Generation Partnership Project (3GPP) and the METIS project have agreed on advanced mechanisms, including mode selection, power control, and resource allocation, that enable D2D technology to realize proximity services both under cellular network coverage and out-of-coverage situations. Specifically, there is a broad consensus that local communications (i.e., ProSe) should be supported for In Network Coverage (INC), Partial Network Coverage (PNC), and Out-of-Network Coverage (ONC) scenarios.

In the INC scenario, D2D wireless communication devices are under the full coverage of one or more network nodes. The D2D wireless communication devices are able to receive signals from and/or transmit signals to at least one network node. The D2D wireless communication device can also maintain a communication link with the network. The network can ensure that the D2D communication does not cause high interference to the cellular layer.

In the PNC scenario, at least one of the D2D wireless communication devices among the D2D devices involved in a D2D communication is under the network coverage and at least one of these devices is not under network coverage.

In the ONC scenario, none of the D2D wireless communication devices involved in a D2D communication are under network coverage. That is, none of these devices can receive signals from and/or transmit signals to any of the network nodes. ONC coverage is due to lack of network coverage in the vicinity of the D2D wireless communication devices or due to insufficient resources in the network nodes to serve or manage the D2D wireless communication devices. As a result, D2D wireless communication devices in the ONC scenario cannot receive assistance from network nodes and their interference cannot be managed by the network nodes.

A wireless communication device in Radio Resource Control (RRC) idle or RRC connected states can be in the INC or PNC scenario. A wireless communication device in the ONC scenario cannot be considered to be in RRC idle state or RRC connected state.

The coverage status of a wireless communication device can change. As an example, a wireless communication device may move from a geographical location outside the range of any network node (ONC scenario) to a geographical location within the range of a network node (INC scenario).

Radio Admission Control (RAC) allows for accepting or rejecting a Radio Bearer (RB) Setup Request (sometimes also called Evolved Packet System (EPS) or System Architecture Evolution (SAE) bearer service by the Core Network since RB in response to successful RAC is typically assigned by the core network). The RAC may also interchangeably be referred to as Admission Control (AC), radio access admission control, radio network admission control, network admission control, radio interface admission control, session admission control, call admission control, radio link admission control, radio bearer admission control or similar terms. For the sake of consistency hereinafter the term RAC is used. In the 3GPP LTE system, RAC is exercised by the base station, i.e., the eNB. The RAC algorithms are proprietary, but they are typically designed for maintaining the quality-of-service (QOS) of ongoing radio bearers (retain-ability) while ensuring high resource utilization and system stability. Specifically, the purpose of RAC is to admit SAE/EPS radio bearers (RB) as long as radio resources are available to provide QOS for in-progress RBs and for the newly arrived RB and also to ensure system stability.

RAC typically checks the availability of radio resources when setting up Guaranteed Bit Rate (GBR) radio bearers, for which—if admitted—a minimum (guaranteed) bit rate should be provided. Some rudimentary RAC may also be exercised for so called best effort SAE/EPS bearers in order to maintain system stability. RAC typically takes into account the available resources (UL, DL) as well as internal BS resources and the QOS class identifiers (QCI) of the ongoing bearers and the QCI of the radio bearer requested. In the 3GPP LTE system, for example, there are standardized QCIs for GBR and non-GBR services associated with delay requirements, packet error loss rate, and priority level.

In LTE, each bearer is associated with an allocation and retention priority (ARP) indicator that is used by the eNB in congestion situations to decide which bearer can be dropped (preempted) and which bearer must be maintained (retained). ARP is also used to make admission decisions of newly arriving RB requests. For example, an arriving high priority RB request can be granted by the eNB even in a congestion situation by preempting an ongoing low priority RB. A low priority RB can also be preempted in order to maintain the QOS of ongoing high ARP bearers.

Recently, the scope of RAC has been extended to the establishment of D2D communications. The basic idea of RAC for D2D is to utilize network control for assessing the resource situation and consequently the admissibility of D2D bearers for D2D communication in cellular spectrum and using cellular resources.

SUMMARY

In some embodiments, a D2D capable wireless communication device receives parameters from a network node. The parameters comprise at least a first set of parameters indicating a configuration for use when the wireless communication device is in a first coverage scenario a second set of parameters indicating a configuration for use when the wireless communication device is in a second coverage scenario. The first coverage scenario is one of an in-network coverage (INC) scenario, a partial network coverage (PNC) scenario, or an out-of-network coverage (ONC) scenario. The second coverage scenario is a different one of the INC scenario, PNC scenario, or ONC scenario. The wireless communication device performs D2D operation in the first scenario based on the first set of parameters and in the second coverage scenario based on the second set of parameters.

In some embodiments, the first set of parameters include an indication whether to use a requested Quality of Service (QOS) and allocation retention priority (ARP) for D2D operation in the first coverage scenario and the second set of parameters include an indication whether to use a requested QOS and ARP for D2D operation in the second coverage scenario.

In some embodiments, the first set of parameters include one or more service types that the wireless communication device is allowed to use in the first coverage scenario and the second set of parameters include one or more service types that the wireless communication device is allowed to use in the second coverage scenario.

In some embodiments, the first set of parameters includes one or more of a maximum transmit power for D2D communications, allowed physical resources for D2D communications, allowed subframes or time slots for D2D communications, allowed modulation and coding scheme (MCS) schemes for D2D communications, arbitration information for D2D communications, D2D discovery signal configuration parameters, D2D communication signal configuration parameters, or other parameters to be used during D2D operation in the first coverage scenario. The second set of parameters may include one or more analogous parameters to be used during D2D operation in the second coverage scenario.

In some embodiments, the wireless communication device initiates the receiving of the first set of parameters and the second set of parameters by sending a service request message requesting parameters for at least two of the coverage scenarios. The service request message may include requested Quality of Service (QOS) and allocation retention priority (ARP) parameters.

In some embodiments, one or more timers may be used to determine for how long the parameters remain valid. For example, a maximum timer value (T1) indicates for how long the second set of parameters remains valid after the wireless communication device moves from the first coverage scenario to the second coverage scenario and/or a maximum timer value (T2) indicates for how long the second set of parameters remains valid after the wireless communication device was granted admission control.

Certain embodiments cover analogous methods in a network node. For example, in some embodiments, a network node determines the first and second sets of parameters and sends them to the wireless communication device. In some embodiments, the network node determines the first and second sets of parameters based on at least one of: stored information, historical data, current radio conditions, current interference conditions, expected availability of resources over the time expected to be spent by the wireless communication device in a certain coverage scenario, expected radio conditions over the time expected to be spent by the wireless communication device in a certain coverage scenario, and expected interference conditions when the wireless communication device moves from the first coverage scenario to the second coverage scenario. In some embodiments, the network node includes values for timer T1 and/or timer T2 in the first or second set of parameters sent to the wireless communication device.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
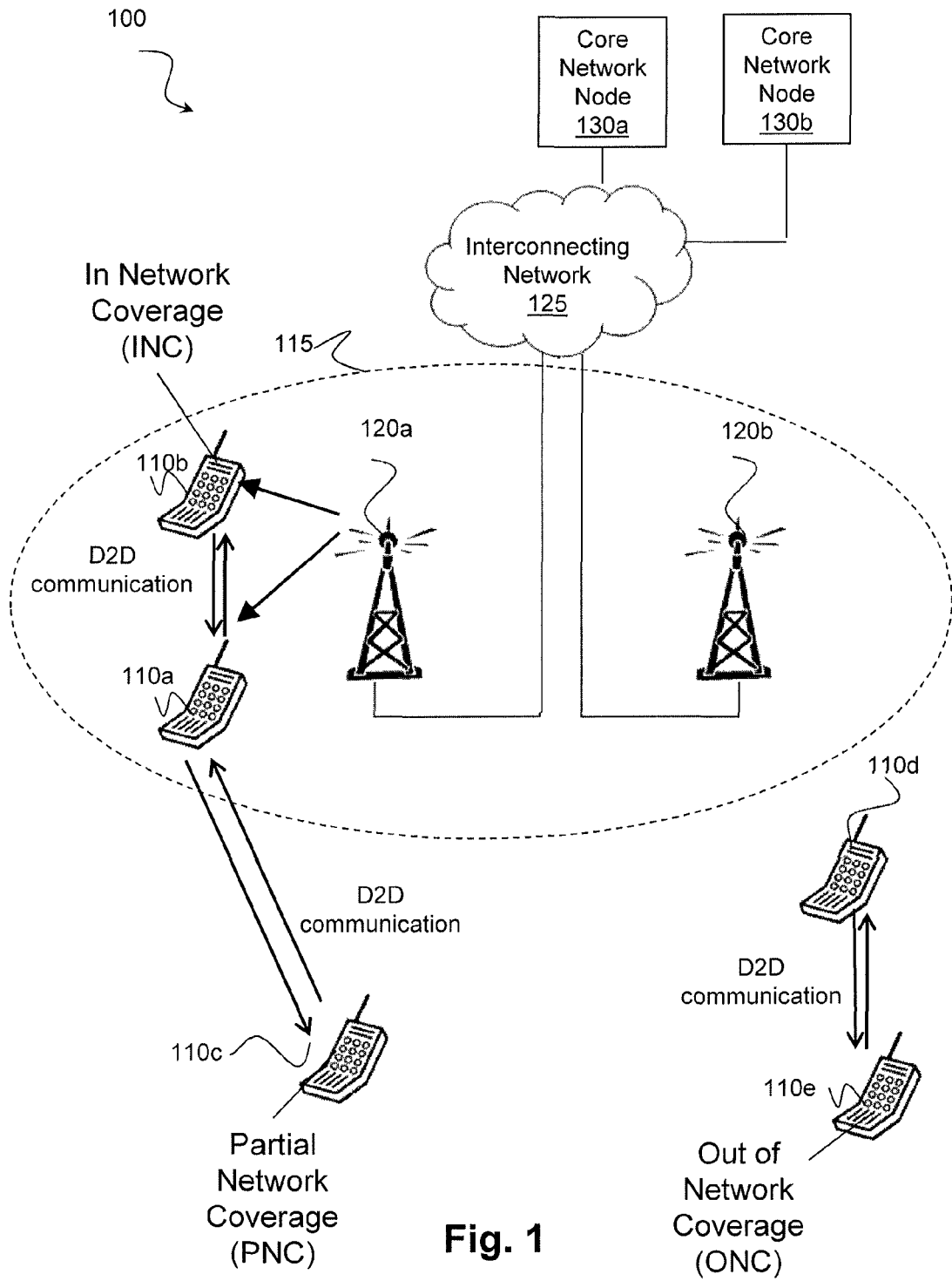
FIG. 1 is a block diagram illustrating an example of a wireless network.

A problem with existing and recently proposed admission control techniques is that they are not applicable in certain real world scenarios, such as certain scenarios in which parts of the network become dysfunctional due to the effects of emergency, disaster, or NSPS situations. As an example, due to an earthquake, large areas that were originally covered by cellular services (INC scenario) get out of coverage. In such situations, wireless communication devices of D2D pairs that previously established a D2D bearer under the control of a network node in an INC scenario may lose full coverage and find themselves under partial network coverage or out-of-network coverage (PNC and ONC scenarios).

Multi-coverage scenarios are not necessarily limited to emergency and disaster situations. In fact, a wireless communication device engaged in D2D communication may encounter a PNC or ONC scenario in "spotty" network deployment scenarios, such as when one or both devices of a D2D pair moves from an area that is under the coverage of a cellular network to an area that is not under the coverage of the cellular network (e.g., certain basements or other challenging indoor environments). In these cases, the behavior of the D2D wireless communication device(s) in terms of usage of radio resource, transmit power levels, or used frequency channels becomes unclear and dependent on the wireless communication device's capability. Such a D2D wireless communication device may cause uncontrolled interference to other wireless communication devices and/or other network nodes in the vicinity.

The following are examples of potentially problematic situations. As a first example, an INC wireless communication device (UE-A) gets admission into the cellular network, including cellular and D2D communications. Subsequently, UE-A gets ONC and causes uncontrolled interference to other ONC D2D wireless communication devices. In some cases, the interference may be caused by UE-A transmitting signals in the UL during the D2D sessions of the other D2D wireless communication devices.

As a second example, the INC UE-A gets admission into the cellular network, including cellular and D2D communication. Thus, UE-A is allowed to transmit/receive D2D traffic to/from its peer (UE-B) in cellular uplink resources. Subsequently, UE-B moves out of network coverage (the UE-A/B pair becomes a PNC D2D pair). UE-A would need to increase its transmit power to maintain coverage with UE-B because UE-B cannot revert to cellular communication when it is out of network coverage. This situation would cause high interference at the network node or at other D2D receivers. Also, UE-B may cause too high interference at other PNC or ONC D2D receivers using the same or overlapping radio resources.

Certain embodiments of the present disclosure may provide solutions for managing interference and radio resources in real world situations, in which INC, PNC and ONC scenarios may dynamically arise in time due to deployment characteristics or external events such as emergency or catastrophe situations. Certain embodiments provide a unified handling of in-network coverage, partial network coverage, and out-of-network coverage scenarios and an admission control mechanism that handles all these scenarios.

In general, particular embodiments extend the information exchange during radio admission control (RAC) (also referred to simply as admission control) such that the network node and the wireless communication device proactively agree upon the resources that are allowed to be used for D2D communication in PNC and/or ONC coverage situations. In other words, the traditional admission control protocol is extended for D2D-capable devices in order to proactively include parameters that enable a D2D wireless communication device to determine its behavior and resources available for its use in case it gets into a PNC or ONC scenario.

The extended admission control allows the D2D wireless communication device to proactively obtain a set of configuration parameters, which the D2D wireless communication device can use in at least two of the three coverage situations or scenarios: INC, PNC, and ONC. The set of configuration parameters for different coverage situations may be different, or some of the parameters may be common to the different coverage situation, or all of the parameters may be common to the different coverage scenarios.

In some embodiments, the proposed solution includes two phases: a (proactive) configuration phase and an execution phase. In the (proactive) configuration phase, the wireless communication device and the network node (e.g., eNB, Mobility Management Entity, Application Server, etc.) exchange information regarding the expected behavior and the resources that the wireless communication device is allowed to use in at least one of PNC and ONC coverage situation. In the execution phase, the wireless communication device determines/senses that it is operating in a PNC or ONC scenario and makes use of the stored configuration information. That is, the wireless communication device behaves according to the stored configuration information, such as maximum transmit power level, allowed frequency channels, allowed physical radio resources, allowed channels (e.g., resource blocks that the wireless communication device is allowed to use), multiple antenna (MIMO) configurations (e.g. pre-coding matrices), medium access control (MAC) parameters, etc.

It follows that the solution consists of a mechanism and associated parameters during the configuration phase, as well as a mechanism for the determination (triggering) of the PNC or ONC scenario and a mechanism that utilizes the stored configuration parameters and modifies the D2D behavior accordingly. In summary, certain embodiments let a base station and/or one or more other network node(s)

proactively configure D2D communication modes by providing parameters that the D2D pair uses when in a partial or out of coverage situation. This way the D2D communication becomes de facto network node controlled even though network coverage is partially or completely lost. Proactive parameter configuration can be introduced as part of the traditional admission control procedure. In some embodiments, an execution phase is triggered by a set of measurements fulfilling some network controlled and configured set of criteria.

FIG. 1 is a block diagram illustrating an example of a wireless network 100 that includes one or more wireless communication devices 110 and a plurality of network nodes. The network nodes include radio access nodes 120 (such as a base station or eNodeB) and core network nodes 130. A wireless communication device 110 may be in an INC scenario, PNC scenario, or ONC scenario, and may be capable of moving from one scenario to another scenario. The INC scenario is illustrated by wireless communication devices 110a-110b. In particular, wireless communication devices 110a-110b may each be capable of communicating directly with radio access node 120a over a wireless interface. Wireless communication devices 110a-110b may also communicate with each other via D2D communication.

The PNC scenario is illustrated by wireless communication device 110c. As illustrated, wireless communication device 110c is not capable of communicating with the wireless network directly because it is outside the coverage area of radio access nodes 120. However, wireless communication device 110c is capable of communicating with wireless communication device 110a via D2D communication. Because wireless communication device 110a is within the coverage of a radio access node 120, wireless communication device 110c can communicate with the wireless network indirectly via its D2D connection with wireless communication device 110a.

The ONC scenario is illustrated by wireless communication devices 110d and 110e. In the ONC scenario, wireless communication device 110d is not communicating with the wireless network either directly or indirectly. However, wireless communication device 110d may communicate with wireless communication device 110e via D2D communication.

In general, wireless communication devices 110 within coverage of radio access node 120a communicate wireless signals to radio access node 120a and/or receives wireless signals from radio access node 120a. The wireless signals contain voice traffic, data traffic, and control signals, for example. Core network node 130 manages the establishment of communication sessions and various other functionality for wireless communication devices 110 within coverage (or partial coverage) of the wireless network. Certain signalling may be considered as being communicated between wireless communication device 110 and core network node 130, such as non-access stratum signalling communicated between wireless communication device 110 and core network node 120 via radio access node 120. The network nodes connect through interconnecting network 125, which refers to any interconnecting system capable of transmitting audio, video, signals, data, messages, or any combination of the preceding. Examples of wireless communication device 110, radio access node 120, and core network node 130 are described with respect to FIGS. 6A-6B, 7A-7B, and 8, respectively.

Figure 2:
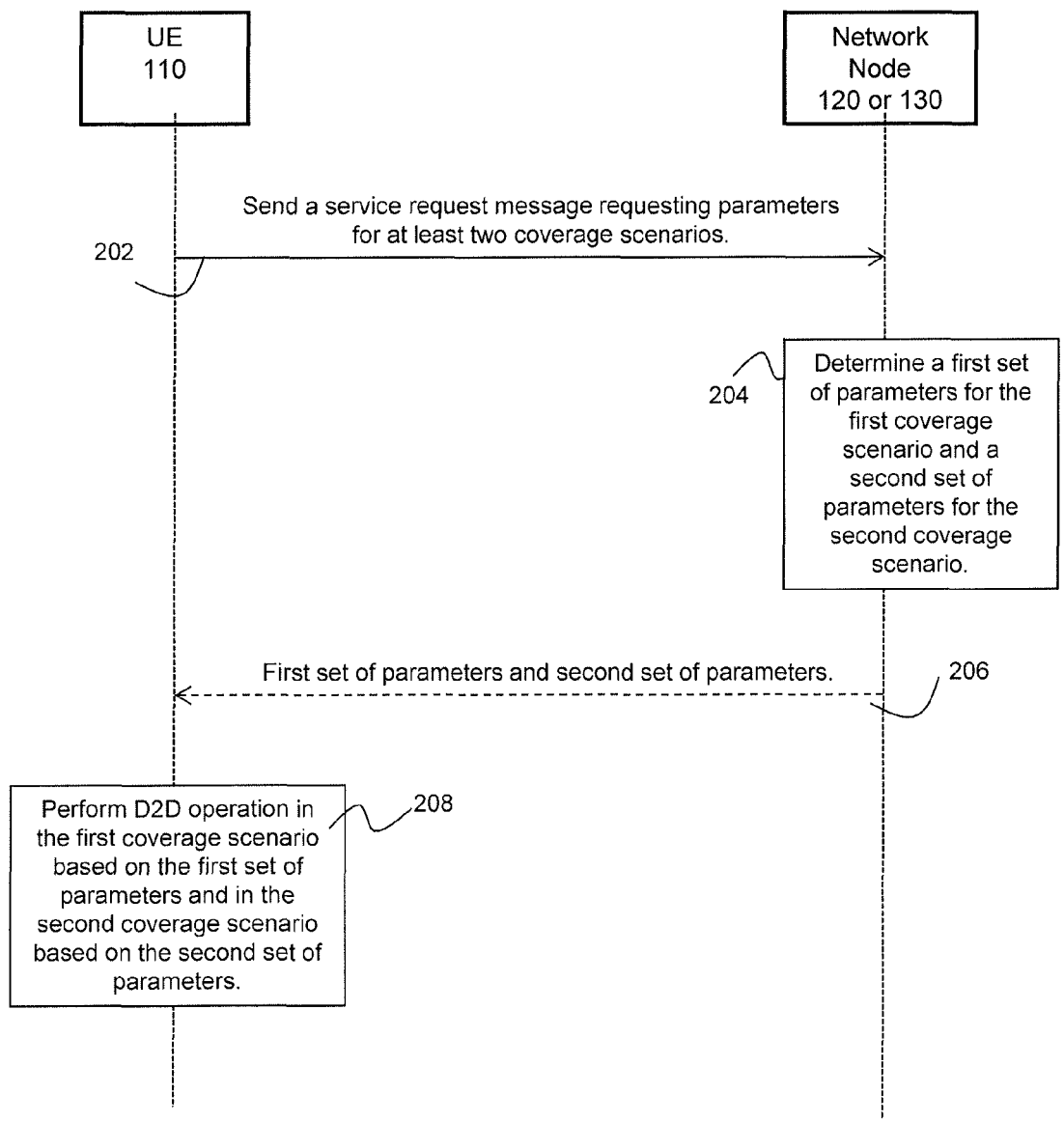
FIG. 2 is a signalling diagram illustrating an example method for facilitating proactive admission control for multi-coverage device-to-device communications.
Figure 3:
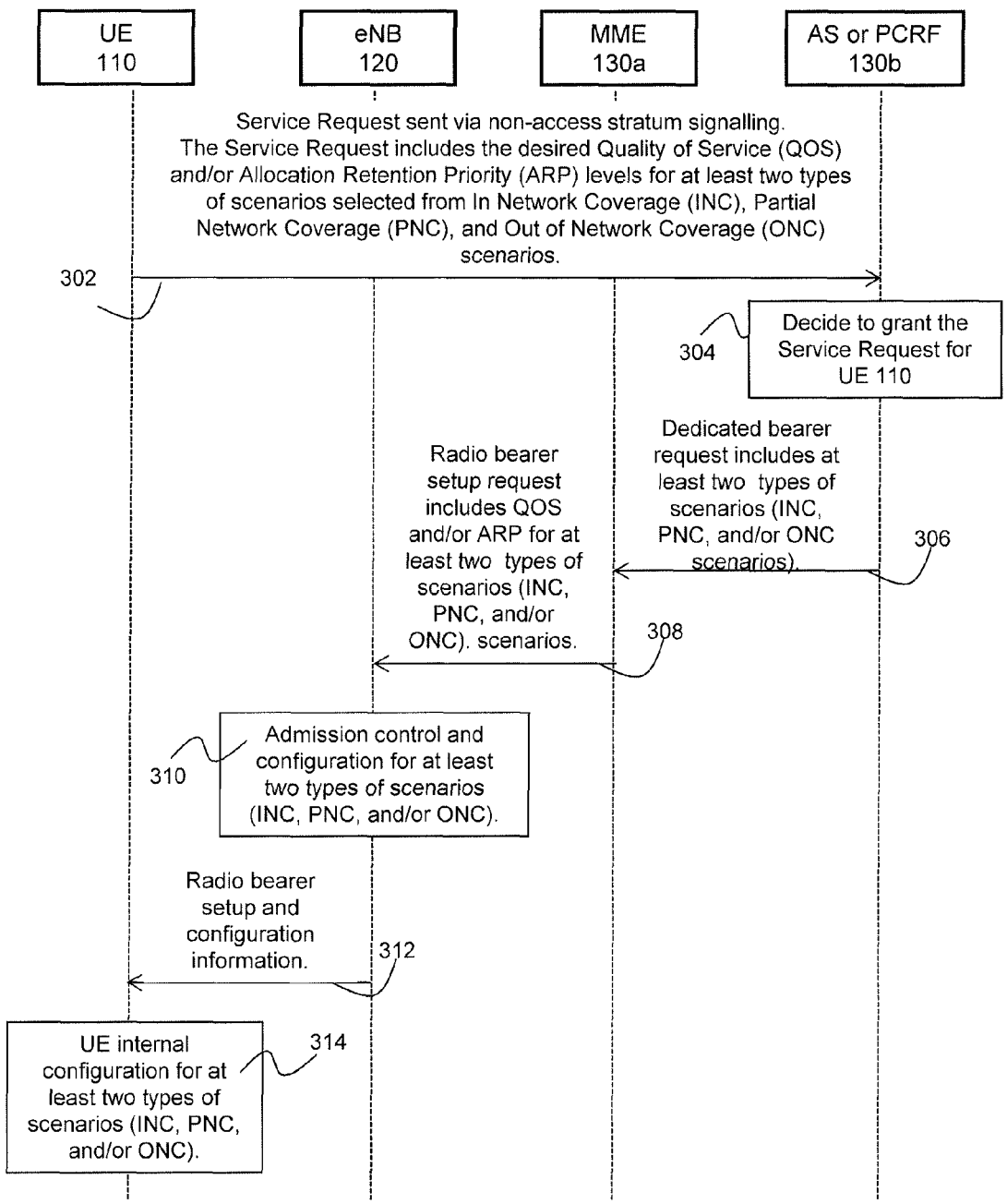
FIG. 3 is a signalling diagram illustrating an example method using core network signalling to facilitate proactive admission control for multi-coverage device-to-device communications.
Figure 4:
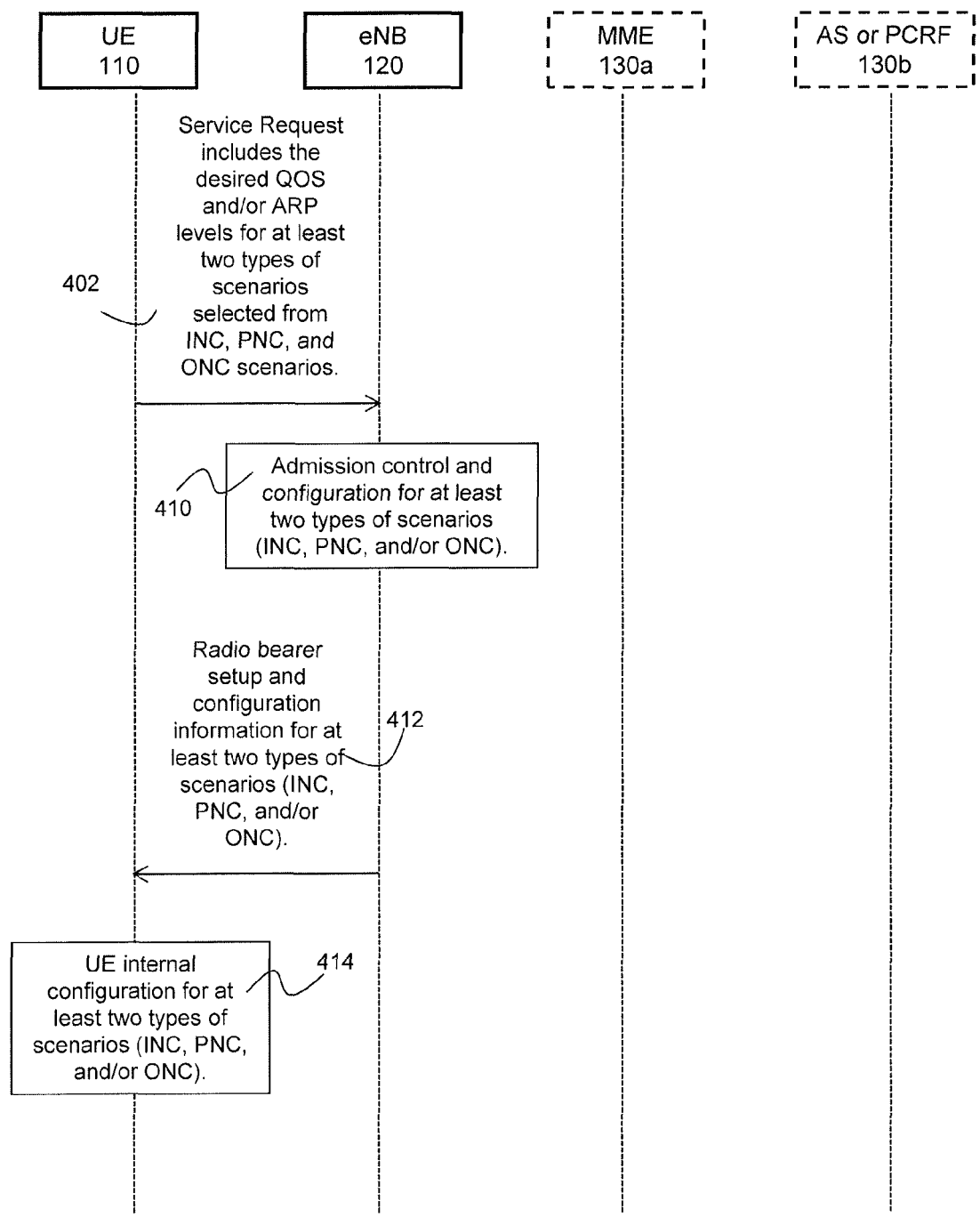
FIG. 4 is a signalling diagram illustrating an example method for facilitating proactive admission control for multi-coverage device-to-device communications independently of core network signalling.

FIGS. 2-4 illustrate examples of a configuration phase for facilitating proactive admission control for multi-coverage device-to-device communications. In particular, FIG. 2 is a signalling diagram illustrating an example method for facilitating proactive admission control for multi-coverage device-to-device communications. Signalling may be communicated between a wireless communication device 110, such as UE 110, and a network node, such as radio access node 120 or core network node 130. Wireless communication device 110 may comprise a processor and a memory that contains instructions executable by the processor to perform the functionality of wireless communication device 110. Similarly, the network node may comprise a processor and a memory that contains instructions executable by the processor to perform the functionality of the network node.

At step 202, wireless communication device 110 initiates receiving INC, PNC, and/or ONC parameters by sending a service request message to the network node. The service request may request parameters for at least two and optionally all three of the coverage scenarios. In some embodiments, wireless communication device 110 requests parameters for a coverage scenario by including requested Quality of Service (QOS) and/or allocation retention priority (ARP) parameters for the scenario in the service request. As an example, wireless communication device 110 may include in the service request sent to the network node at least two of: (1) an INC-QOS and INC-ARP, (2) a PNC-QOS and PNC-ARP, and (3) an ONC-QOS and ONC-ARP.

At step 204, the network node determines parameters for at least two and optionally all three coverage scenarios. In particular, the network node determines a first set of parameters for when the wireless communication device is in a first coverage scenario, a second set of parameters for when the wireless communication device is in a second coverage scenario, and optionally a third set of parameters for when the wireless communication device is in a third coverage scenario. The first, second, and third coverage scenarios are different from one another. As a non-limiting example, if at step 202 wireless communication device 110 requested parameters for the INC scenario and the ONC scenario, the network node may determine a first set of parameters for the INC scenario and a second set of parameters for the ONC parameters.

Any suitable parameters may be included in the first and second sets of parameters. At least some of the parameters are applicable to admission control. In some embodiments, the first set of parameters includes an indication whether to use the requested INC-QOS and INC-ARP for admission control in the INC scenario, and the second set of parameters includes an indication whether to use the requested ONC-QOS and ONC-ARP for admission control in the ONC scenario.

In some embodiments, the first set of parameters includes one or more service types that wireless communication device 110 is allowed to use in the first coverage scenario and the second set of parameters includes one or more service types that the wireless communication device 110 is allowed to use in the second coverage scenario. Examples of service types include national security and public safety (NSPS), relaying function, social networking, cooperative positioning, or other D2D service types. In one example, network node may permit more D2D service types for the INC scenario (such as NSPS, relaying function, social networking, and cooperative positioning) and fewer D2D service types for the ONC scenario (such as NSPS only), or vice versa. The network node may optionally determine the permitted D2D service types based on current or expected network conditions. For example, if interference is high, signal quality is poor, or resources are scarce, the network node may decide to permit wireless communication device 110 to use D2D operation for NSPS services, but not for social networking services.

In some embodiments, the first set of parameters indicates whether wireless communication device 110 in the first coverage scenario is allowed to use D2D discovery operations and/or D2D communication operations. Similarly, the second set of parameters indicates whether wireless communication device 110 in the second coverage scenario is allowed to use D2D discovery operations and/or D2D communication operations. D2D discovery operations may allow wireless communication device 110 to send signals for discovering a D2D peer. D2D communication operations may allow wireless communication device 110 to send and/or receive traffic with the D2D peer.

In some embodiments, the first set of parameters may include one or more of a maximum transmit power for D2D communications, allowed physical resources for D2D communications, allowed subframes or time slots for D2D communications, allowed modulation and coding scheme (MCS) schemes for D2D communications, arbitration information for D2D communications, D2D discovery signal configuration parameters, D2D communication signal configuration parameters, or other parameters to be used during D2D operation in the INC scenario. The second set of parameters may include analogous parameters to be used during D2D operation in the ONC scenario. Depending on the embodiment, the first set of parameters and/or second set of parameters may include any suitable combination of one or more of the preceding parameters and/or any other suitable parameters.

The values of the first and second set of parameters can be the same or different. For example, if the maximum transmit power for D2D communications in the INC scenario is X, the maximum transmit power for D2D communication in the ONC scenario could also be X or it could be something different, such as Y.

In some embodiments, the network node determines the first and second sets of parameters based on one or more of stored information, historical data, current radio conditions, current interference conditions, expected availability of resources over the time expected to be spent by the wireless communication device in a certain coverage scenario, expected radio conditions over the time expected to be spent by the D2D wireless communication device in a certain coverage scenario, and expected interference conditions when the wireless communication device moves from the first coverage scenario to the second coverage scenario, and/or other suitable factors. The network node may use any suitable combination of one or more of the preceding factors to determine the first and second sets of parameters. The time expected to be spent by the D2D wireless communication device in a certain coverage scenario can be based on historical data or statistics related to the time spent by D2D wireless communication devices in different coverage scenarios.

As an example, the network node may place more restrictions on D2D operation if the signal quality is poor or expected to be poor for devices served by the network node. This may be determined by comparing the signal quality to a minimum signal quality threshold such that the network node places more restrictions on D2D operation when the signal quality falls below the minimum signal quality threshold. Examples of restrictions that may be placed on D2D operation may include reducing the maximum transmit power, reducing the resources available for D2D operation, and so on. As another example, the network node may place more restrictions on D2D operation if wireless communication device causes or is expected to cause high levels of interference. This may be determined by comparing an interference level associated with the wireless communication device to a maximum interference level threshold such that the network node places more restrictions on D2D operation when the maximum interference level threshold is exceeded.

In some situations, such as when resources are scarce or interference is severe, the network node may instruct wireless communication device 110 not to use D2D operations in one or more of the INC, PNC, and/or ONC coverage scenarios. Such an instruction may be indicated explicitly to wireless communication device 110 or implicitly. For example, if wireless communication device 110 sends a service request for INC and ONC parameters, and the network node responds only with INC parameters, wireless communication device 110 may understand the absence of ONC parameters to indicate an implicit instruction not to use D2D operation in the ONC scenario.

In some embodiments, the first or second set of parameters include one or more timers indicating for how long the first and/or second sets of parameters remain valid. As an example, a maximum timer value (T1) may indicate for how long the parameters remain valid after wireless communication device 110 moves from the current coverage scenario to a different coverage scenario. Thus, if wireless communication device 110 detects that it has moved from the INC scenario to the ONC scenario, for example, wireless communication device 110 may start timer T1. When timer T1 expires, wireless communication device stops using the parameters associated with timer T1. As another example, a maximum timer value (T2) may indicate for how long the parameters remain valid after the wireless communication device was granted admission control. Thus, if wireless communication device 110 detects that admission control is granted, it may start timer T2. When timer T2 expires, wireless communication device 110 stops using the parameters associated with timer T2 (which may or may not be the same as the parameters associated with timer T1). Various embodiments may use only timer T1, only timer T2, or both timer T1 and timer T2.

At step 206, network node sends the first and second sets of parameters for receipt by wireless communication device 110. The network node may send the first and second sets of parameters directly to wireless communication device 110 or indirectly via another node, such as via a D2D connection with a second wireless communication device.

At step 208, wireless communication device 110 performs D2D operation using the set of parameters applicable to the current coverage scenario. Thus, when wireless communication device 110 is in the INC scenario, it performs D2D operation based on at least some of the parameters from the INC set of parameters. When wireless communication device 110 is in the ONC scenario, it performs D2D operation based on at least some of the parameters from the ONC set of parameters.

Although certain examples in FIG. 2 described the first set of parameters as corresponding to the INC scenario, in other embodiments, the first set of parameters could correspond to the PNC or ONC scenario. Similarly, although certain examples in FIG. 2 described the first set of parameters as corresponding to the ONC scenario, in other embodiments, the second set of parameters could correspond to the PNC or INC scenario as long as the second set of parameters relate to a different coverage scenario than the first set of parameters. In addition, in some embodiments, a third set of parameters may be used to configure the third coverage scenario.

FIG. 3 is a signalling diagram illustrating an example method using core network signalling to facilitate proactive admission control for multi-coverage device-to-device communications. More specifically, FIG. 3 shows the messages between wireless communication device 110, radio access node 120, and core network nodes 130 that configure wireless communication device 110 for not only the traditional INC scenario, but also the PNC and/or ONC scenarios. For purposes of explanation, FIG. 3 shows an LTE implementation where wireless communication device 110 may be implemented as user equipment (UE 110), radio access node 120 may be implemented as an eNB 120, core network node 130a in the radio access network may be implemented as a mobility management entity (MME) 130a, and core network node 130b in the backend network is implemented as an access server or policy and charging rules function (AS/PCRF) 130b.

At step 302, the D2D UE 110 initiates an admission request by sending a service request that explicitly indicates to AS/PCRF 130b that it needs admission to resources for at least two of the three situations in terms of D2D coverage: INC, PNC, and ONC scenarios. This type of admission control (AC) is therefore interchangeably called proactive AC, proactive multi-coverage AC, extended AC, extended proactive AC, extended proactive multi-coverage AC, etc.

The requested QOS and ARP levels for INC, PNC, and ONC scenarios may be different. For example, UE-110 may use non-access stratum signalling to AS/PCRF 130b to indicate a high QOS and high ARP service when it is under full coverage (INC scenario) and a best effort service level whenever UE 110 itself or its communicating peer in the case of a D2D bearer is outside of network coverage (PNC or ONC scenario).

AS/PCRF 130b may check the requested parameters against subscription data and decide to grant the service request at step 304. AS/PCRF 130b issues a dedicated bearer request to the radio access network (RAN). For example, AS/PCRF 130b sends the dedicated bearer request to MME 130a at step 306 and MME 130a in turn sends a radio bearer setup request to eNB 120 at step 308. At step 310, the RAN (e.g., eNB 120) makes the admission control decision in a manner similar to traditional RAC mechanisms. In addition, the RAN also compiles a set of parameters concerning the UE behavior in case it gets into a PNC or ONC scenario. For example, the RAN may be configured to use dedicated spectrum resources (frequency channels) for D2D communication or it may want to limit the maximum transmit power level that a D2D pair outside network coverage is allowed to use. Also, the RAN can include a set of parameters related to the timing for the validity of the configuration parameters in PNC or ONC scenarios. At step 312, the RAN communicates the radio bearer setup and configuration information to UE 110 and at step 314, UE 110 performs internal configuration for at least two type of coverage scenarios (INC, PNC, and/or ONC).

In some embodiments, a network node may also asses the implication of proactively granting multi-coverage admission control to the D2D UE 110 on the radio characteristics. Examples of radio characteristics are radio conditions or interference situation, availability of resources over the time expected to be spent by the D2D UE 110 in a certain coverage scenario, and expected radio conditions or interference situation in case the assigned resources will be used by the D2D UE 110 under PNC or ONC coverage situations.

If the radio characteristics are expected to remain within an acceptable limit under D2D operation in any of the allowed coverage situation then the network node may decide to proactively admit the D2D UE 110. The radio characteristics are assumed to be within an acceptable limit or are considered favorable provided, for example, the received signal qualities in uplink at the network node and/or in downlink at plurality of UEs remain above their respective threshold. Another criterion for radio characteristic being within an acceptable limit may be that on each physical resource (e.g., RBs) assigned to the D2D UE 110, the received interference level is below a threshold.

The network node may also proactively assign the D2D UE 110 with one or more service types which are permitted for use by the D2D UE 110 under different coverage situations. For example, the D2D UE 110 may receive from the network node a set of information which maps QOS parameters or service types to different coverage situations. This mapping, which may be provided in terms of a look up table or pre-defined identifiers of situation-to-service type mapping, could be part of the admission control parameters or could be sent to the D2D UE 110 in a separate message during admission control procedure. This is elaborated with the examples shown in Tables 1 and 2.

Table 1 shows an example where the D2D UE 110 is proactively admitted to operate under two different coverage situations (INC and ONC). Furthermore, under each coverage situation the D2D UE 110 is allowed to use only one of the specified service types. For example, under ONC the UE 110 is allowed to use the assigned resources only for critical type of services—NSPS and cooperative positioning.

TABLE 1

An example of mapping between allowed coverage situation and service types proactively granted to UE where INC and ONC are granted

| Coverage situation | RAC granted (Yes/No) | Allowed service type(s) |
|---|---|---|
| INC | Yes | National security and public safety (NSPS) |
| | | Relaying function |
| | | Social networking |
| | | Cooperative positioning |
| PNC | No | N/A |
| ONC | Yes | National security and public safety (NSPS) |
| | | Cooperative positioning |

Table 2 shows an example where the D2D UE 110 is proactively admitted to operate under INC and PNC scenarios. However, under PNC the D2D UE 110 is allowed to use three types of services compared to two types of services allowed under ONC scenario in the previous example. This is because under PNC scenario, the network node has more control over resources used by the D2D UE 110 compared to the case when the D2D UE 110 operates under ONC scenario.

TABLE 2

Another example of mapping between allowed coverage situation and service types proactively granted to UE where INC and PNC are granted

| Coverage situation | RAC granted (Yes/No) | Allowed service type(s) |
|---|---|---|
| INC | Yes | National security and public safety (NSPS) |
| | | Relaying function |
| | | Social networking |
| | | Cooperative positioning |
| PNC | Yes | National security and public safety (NSPS) |
| | | Cooperative positioning |
| | | Relaying function |
| ONC | No | N/A |

In addition or in alternative to the examples of Table 1 and Table 2 above, other parameters configured in the set of parameters may include quality of service (QOS) and allocation retention priority (ARP) related parameters. Referring back to step 302 of FIG. 3, UE 110 may include QOS and ARP requests specifically for the PNC and ONC states at D2D bearer (admission) request/service request message. For example, UE 110 may request a specific QOS class (via the standardized QOS class indicators, QCI) for the INC case and similar or different QCI values specifically for the PNC and/or ONC cases. Likewise, UE 110 may request a specific ARP priority level (e.g. high priority—meaning that the preemption of a radio bearer should be avoided as long as feasible) for the INC, PNC, and/or ONC scenarios.

Radio access node 120 (e.g., eNode B, base station, access point, etc.) that owns the radio resources may explicitly grant/reject access to resources to be used in at least two of the three situations in terms of D2D coverage: INC, PNC, and ONC scenarios. Radio access node 120 may also specify radio resources that UE 110 may use in any of INC, PNC, and/or ONC scenarios. Examples of radio resources include PHY resource blocks, such as resource blocks, maximum transmit power, modulation and coding scheme (MCS), etc.

As part of the admission control decision, radio access node 120 may signal additional parameters to the D2D capable UE 110. Examples of such parameters are:

Timer to start upon coverage change situation;

The maximum duration (T1) over which the D2D UE 110 is allowed to use the proactively assigned resources under different coverage situation since the D2D UE 110 started to operate under that particular coverage situation. The timer T1 may also be set to a very large value or infinite in order to allow the D2D UE 110 to operate until the coverage situation changes or it reverts to the INC scenario.

The maximum duration (T2) over which the proactively assigned resources under different coverage situation for D2D operation are valid since the admission control was granted by the network node. The timer T2 may also be set to a very large value or infinite in order to allow the D2D UE 110 to operate until the coverage situation changes or it reverts to the INC scenario.

Whether UE 110 may use these resources for all types of D2D operations or only for certain types of D2D operations. Examples of different types of D2D operation are D2D discovery and D2D communication.

The values of the above parameters may also be pre-defined. Alternatively certain parameters may be pre-defined while the remaining ones may be configured by the network node.

In a PNC or ONC scenario, the D2D UEs exchange parameters and use an arbitration mechanism to agree on the parameters of the D2D bearer. This way the problems listed previously get solved even in PNC and ONC scenarios.

Typically at least some of the parameters for different coverage situations are different. However, certain parameters, such as allowed physical channels, may be common to more than one coverage scenario. In some cases, such as when interference is low and/or when traffic is low (e.g., the number of D2D UEs in a cell is below a threshold), then all the parameters may be common. For example, different coverage scenarios may have the same maximum transmit power, number of allowed channels to use, etc. For example the network node may send one set of parameters associated with one of the coverage situations and further indicate whether they are the same or not for the other allowed coverage situation(s). Only the uncommon parameters across different coverage situations need be sent separately in this example. In this way, the common parameters need not be repeatedly sent for all the allowed coverage situations and therefore the signalling overheads are reduced. This approach may also use less memory in the D2D UE because common parameters need only be stored once.

Figure 5:
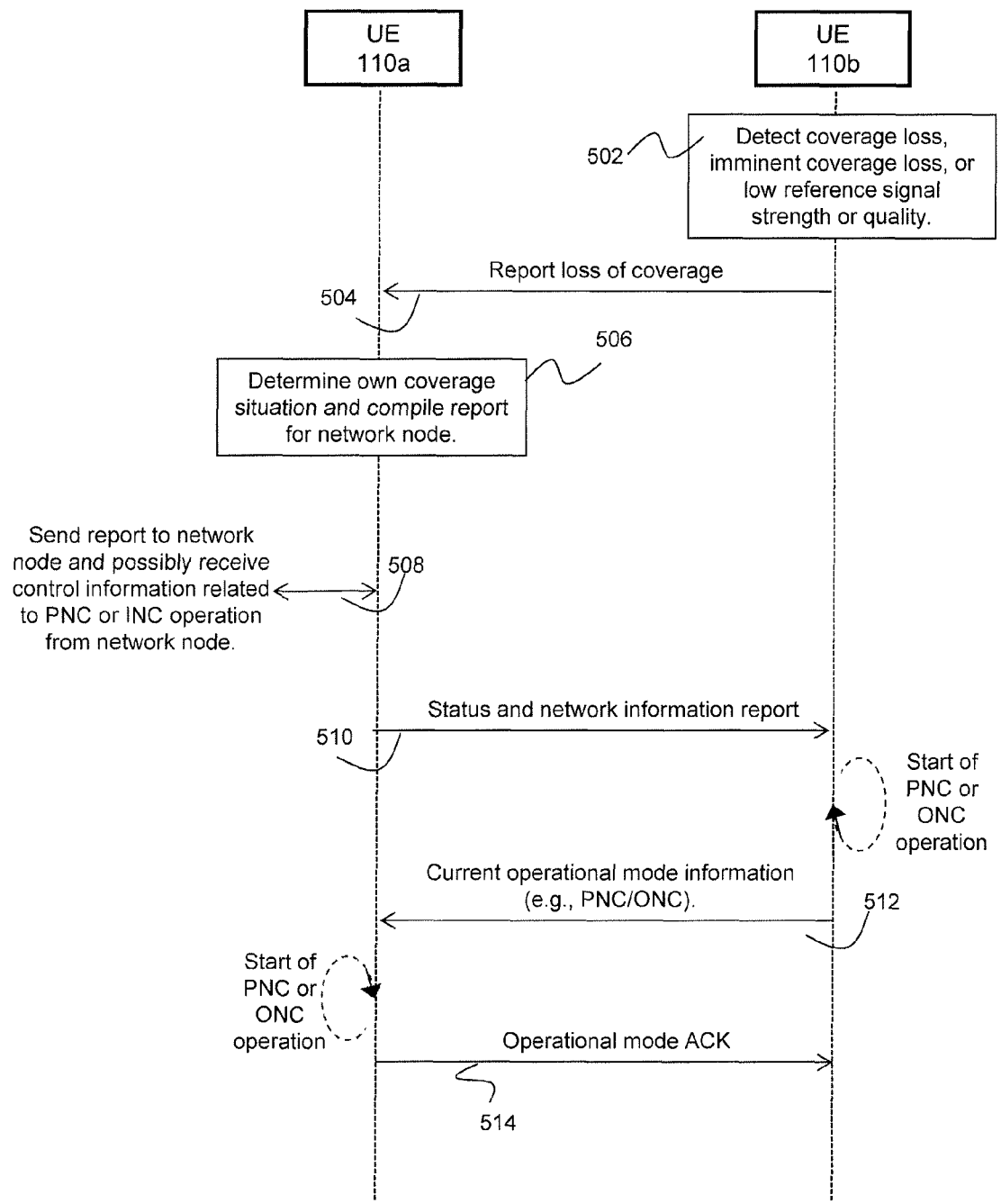
FIG. 5 is a signalling diagram illustrating an example method for D2D pair triggering and initial operation.

The D2D UE proactively admitted for operating under multi-coverage situation (i.e., any two or more of INC, PNC, and ONC scenarios) stores the above mentioned configuration parameters, including mapping tables, received from the network node. The stored parameters are retrieved and used for D2D operation in one of the allowed D2D coverage situation. FIG. 5 below provides an example of an execution phase in which parameters are retrieved and used for D2D operation.

FIG. 4 is a signalling diagram illustrating an example method for facilitating proactive admission control for multi-coverage device-to-device communications independently of core network signalling. More specifically, FIG. 4 provides alternative to FIG. 3 where UE 110 and the RAN node (e.g., eNB 120 or a BS) may admit a D2D bearer request and configure the associated parameters for the INC, PNC, and ONC scenarios without core network signalling. At step 402, UE 110 sends eNB 120 a Service Request that includes the desired QOS and/or ARP levels for at least two types of coverage scenarios selected from INC, PNC, and ONC scenarios. At step 410, eNB 120 makes the admission control decision and configures parameters for the at least two coverage scenarios. At step 412, eNB 120 sends UE 110 the radio bearer setup and configuration information for the at least two types of coverage scenarios. At step 414, UE 110 performs internal configuration for the at least two types of coverage scenarios.

After the configuration phase, examples of which were described with respect to FIGS. 2-4, certain embodiments may trigger an execution phase. The execution phase may be triggered by either a network node 120/130 or a wireless communication device 110. FIG. 5 is a signalling diagram illustrating an example method for D2D pair (UE-A and UE-B) triggering and initial operation. Triggering may occur in response to the D2D UE changing coverage scenarios. For example, at step 502, UE-B detects coverage loss, imminent coverage loss, or low reference signal strength or quality.

In certain situations, a D2D bearer is established when the UE changes coverage scenarios. If a D2D pair previously covered by the network (INC scenario) gets into a PNC state while having a D2D bearer established, the UE that has lost coverage and cannot communicate with the network node (referred to as UE-B) reports to its peer UE (referred to as UE-A), see step 504. UE-A may then determine its own coverage situation and, if UE-A is in coverage, it may compile a report and send the report to the network node, see steps 504 and 506.

Any suitable node may cause UE-A to send the report to the network node in step 506. For example, when UE-B informs UE-A that it lost coverage in step 504, it may also request UE-A to report the loss of coverage to the network node if possible (if peer UE-A is still under network coverage). Alternatively, in response to UE-A receiving the loss-of-coverage report from UE-B in step 504, UE-A autonomously reports to the network node that UE-B lost coverage. As a third alternative, according to some embodiments, the network node periodically requests a status report from one or both of the UEs regarding their coverage, for example, using reference signal measurement reports. The network node then autonomously detects either a loss of coverage for UE-B or determines an imminent loss of coverage. Once the network node detects PNC state, it instructs UE-A to enter PNC mode and optionally sends parameters for use in PNC, INC, or ONC operation. UE-A then may be instructed or decide autonomously to communicate to UE-B to enter PNC operation.

In some embodiments, UE-A sends UE-B a status and network information report at step 510, UE-B checks the current operational mode (e.g., PNC or ONC) and sends the current operation mode to UE-A at step 512, then UE-A starts the current operation mode and sends an acknowledgement to UE-B at step 514.

Once the D2D pair determined whether they are in PNC or ONC state, they start operating according to the configuration that was previously determined and set by the network node during the configuration phase, examples of which were described with respect to FIGS. 2-4 above. In this execution phase, UE-A and UE-B start using the D2D bearer according to the parameters set in the configuration phase, depending on whether the D2D pair determined whether they are currently operating in a PNC or in an ONC scenario. The D2D UE may operate under this coverage situation by using the allowed parameters until the maximum allowed time expires. Examples of the employed configuration parameters and other information during this execution phase include:

Maximum transmit power used for D2D communication both by UE-A and UE-B.

One of the allowed service types that map to the coverage situation in which the D2D operates.

Allowed physical resources (e.g., resource blocks) for use by UE-A and UE-B to maintain the D2D bearer. This piece of information is important not only to limit the caused interference to specific time and frequency channels, but also for the peer party to facilitate configuration of its receiver. For example, UE-A transmits using a Subset-A of the available resource blocks, while UE-B transmits on Subset-B.

The preconfigured D2D parameters may include information that facilitates the arbitration between UE-A and UE-B. For example, the network node may have preconfigured during the configuration phase that in case of entering an ONC state, UE-A should act as master node while UE-B should act as a slave node regarding synchronization maintenance. That is, UE-A should periodically transmit synchronization signals that UE-B should decode for time and frequency synchronization purposes.

The preconfigured D2D parameters may include separate subsets of information elements to be used for constructing D2D discovery signals and D2D communication signals. D2D discovery signals are associated with periodicity; transmit power level, modulation and coding scheme, used frequency channels and other parameters known by the skilled person. D2D communication signals are associated with similar parameters but the value of these parameters may be different from those of the discovery signals. Additionally, communication parameters are configured consistently for transmission and reception for UE-A and UE-B.

The previous explanation of FIG. 5 was described for a situation where a D2D bearer is established when the UE changes coverage scenarios. In certain alternative situations, a D2D bearer is not established when the UE changes coverage scenarios. A UE (UE-B) may detect loss of coverage autonomously such that UE-B itself determines that it is out of coverage, see e.g., step 502 of FIG. 5. Loss of coverage could be detected, for example, by losing detection of reference signals from the network node or detecting that the strength of the received reference signal dropped below a predetermined threshold over certain time period. In some embodiments, if signal quality, such as signal-to-interference-plus-noise ratio (SINR) or signal-to-noise ratio (SNR), of at least a certain type reference signal (e.g., synchronization signal) transmitted by radio access node 120 falls below a threshold (e.g., below −10 dB) at the D2D UE over at least certain duration, T0, (e.g., T0=10 seconds), then the D2D UE assumes that it has lost the network coverage. In this case, UE-B starts a procedure to determine whether it can communicate with UE-A and whether UE-A is under network coverage in order to determine whether the D2D pair is in PNC or ONC state. If UE-B can communicate with UE-A, the UEs may perform steps analogous to steps 502-514 of FIG. 5. The D2D UE may in this case retrieve PNC and/or ONC parameters from UE-A (e.g., as part of message 510) and/or retrieve from its memory the stored configuration parameters for operating in PNC or ONC as further elaborated above.

Figure 6A:
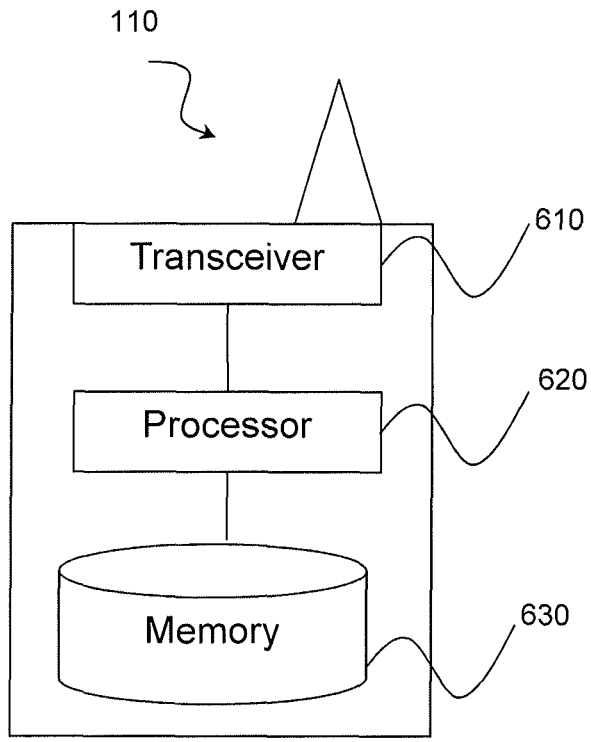
FIG. 6A is a block diagram illustrating an example of a wireless communication device.

FIG. 6A is a block diagram illustrating an example of a wireless communication device. Examples of wireless communication device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Wireless communication device 110 may interchangeably be referred to by the generic/non-limiting term user equipment (UE). Wireless communication device 110 includes at least a transceiver 610, a processor 620, and a memory 630. In some embodiments, transceiver 610 facilitates transmitting wireless signals to and receiving wireless signals from radio access node 120 (e.g., via an antenna), processor 620 executes instructions to provide some or all of the functionality described herein as provided by a wireless communication device 110, and memory 630 stores the instructions executed by processor 620.

Processor 620 includes any suitable combination of hardware and software implemented in one or more integrated circuits or modules to execute instructions and manipulate data to perform some or all of the described functions of wireless communication device 110. Memory 630 is generally operable to store computer executable code and data. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless communication device 110 include additional components (beyond those shown in FIG. 6A) responsible for providing certain aspects of the device's functionality, including any of the functionality described above and/or any additional functionality (including any functionality necessary to support the solution described above).

Figure 6B:
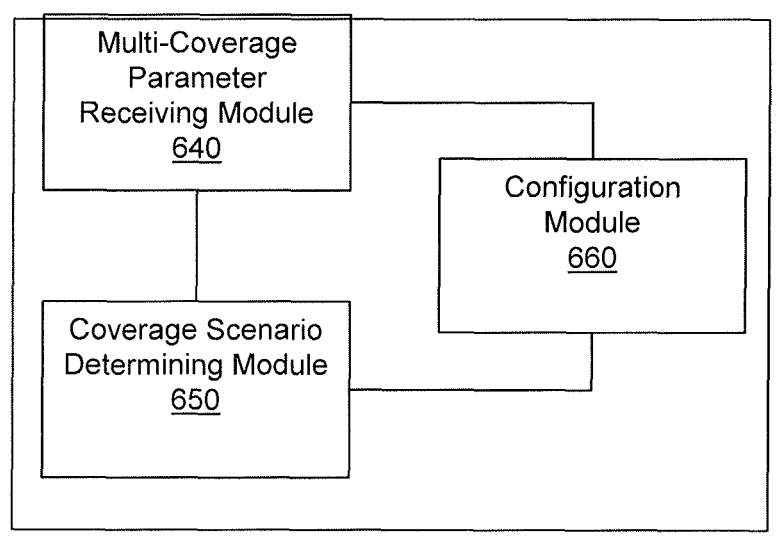
FIG. 6B is a block diagram illustrating example components of a wireless communication device.

FIG. 6B is a block diagram illustrating example components of a wireless communication device 110. The components may include a multi-coverage parameter receiving module 640, a coverage scenario determining module 650, and a configuration module 660. In some embodiments, one or more of modules 640, 650, and 660 may be implemented using one or more processors 620 of FIG. 6A. In general, multi-coverage parameter receiving module 640 receives a first set of parameters indicating a configuration for use in D2D operation when wireless communication device 110 is in a first coverage scenario (one of the INC, PNC, and ONC scenarios) and a second set of parameters indicating a configuration for use in D2D operation when wireless communication device 110 is in a second coverage scenario (a different one of INC, PNC, and ONC scenarios). Multi-coverage parameter receiving module 640 optionally receives a third set of parameters for the third coverage option. Coverage scenario determining module 650 determines whether wireless communication device 110 is in the INC, PNC, or ONC scenario. Configuration module 660 applies the first, second, or third parameters based on the current coverage scenario. For example, when performing D2D operation in the INC scenario, configuration module 660 applies INC parameters. When performing D2D operation in the PNC scenario, configuration module 660 applies PNC parameters. When performing D2D operation in the ONC scenario, configuration module 660 applies ONC parameters.

Figure 7A:
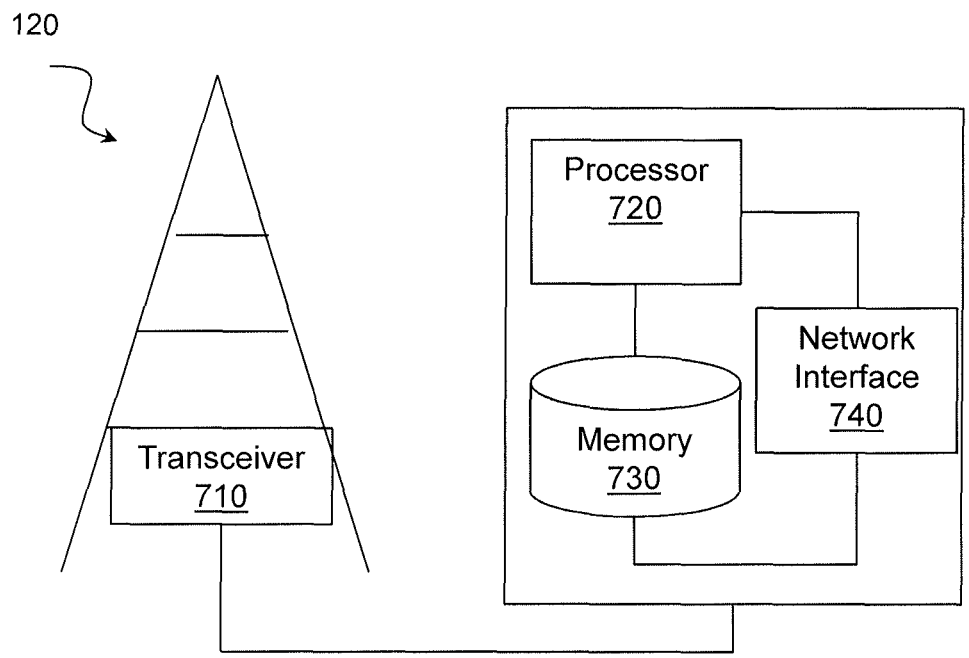
FIG. 7A is a block diagram illustrating an example of a radio access node.

FIG. 7A is a block diagram illustrating an example of a radio access node. Radio access node 120 can be, for example, an eNodeB, a node B, a base station, a wireless access point (e.g., a Wi-Fi access point), a low power node, a base transceiver station (BTS), a transmission point or node, or a remote RF unit (RRU), etc. Radio access node 120 includes at least one transceiver 710, at least one processor 720, at least one memory 730, and at least one network interface 740. Transceiver 710 facilitates transmitting wireless signals to and receiving wireless signals from wireless communication device 110 (e.g., via an antenna); processor 720 executes instructions to provide some or all of the functionality described above as being provided by a radio access node 120; memory 730 stores the instructions executed by processor 720; and network interface 740 communicates signals to backend network components, such as a gateway, switch, router, Internet, Public Switched Telephone Network (PSTN), other radio access nodes 120, and/or core network nodes 130. The processor 720 and memory 730 can be of the same types as described supra with respect to FIG. 6A.

In some embodiments, network interface 740 is communicatively coupled to processor 720 and refers to any suitable device operable to receive input for radio access node 120, send output from radio access node 120, perform suitable processing of the input or output or both, communicate to other devices, or any combination of the preceding. Network interface 740 includes appropriate hardware (e.g., port, modem, network interface card, etc.) and software, including protocol conversion and data processing capabilities, to communicate through a network.

Other embodiments of radio access node 120 include additional components (beyond those shown in FIG. 7A) responsible for providing certain aspects of the node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Figure 7B:
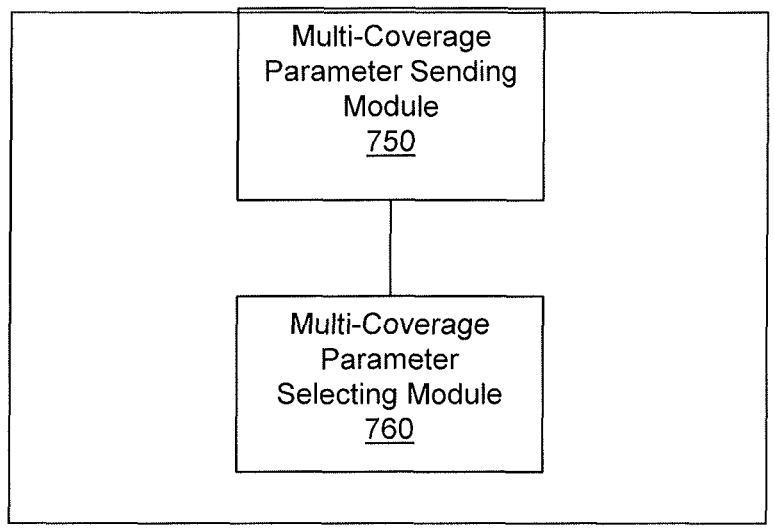
FIG. 7B is a block diagram illustrating an example of components of a radio access node.

FIG. 7B is a block diagram illustrating an example of components of a radio access node 120 according to certain embodiments. The components may include a multi-coverage parameter sending module 750 and a multi-coverage parameter selecting module 760. In some embodiments, one or more of modules 750 and 760 may be implemented using one or more processors 720 of FIG. 7A. In general, multi-coverage parameter selecting module 760 may receive a service request from a wireless communication device 110 requesting configuration parameters for at least two coverage scenarios (INC, PNC, and/or ONC). Multi-coverage parameter selecting module 760 selects a first set of parameters indicating a configuration for wireless communication device 110 to use when in a first coverage scenario (one of the INC, PNC, and ONC scenarios), a second set of parameters for wireless communication device 110 to use when in a second coverage scenario (a different one of INC, PNC, and ONC scenarios), and optionally a third set of parameters for the third coverage scenario. In some embodiments, multi-coverage parameter selecting module 760 selects the parameters based on one or more of stored information, historical data, current radio conditions, current interference conditions, expected availability of resources over the time expected to be spent by the wireless communication device in a certain coverage scenario, expected radio conditions over the time expected to be spent by the wireless communication device in a certain coverage scenario, and expected interference conditions when the wireless communication device moves from the first coverage scenario to the second coverage scenario. Multi-coverage parameter sending module 750 sends the selected first, second, and (optionally) third sets of parameters to wireless communication device 110.

Figure 8:
FIG. 8 is a block diagram illustrating an example of a core network node.
Figure 8:
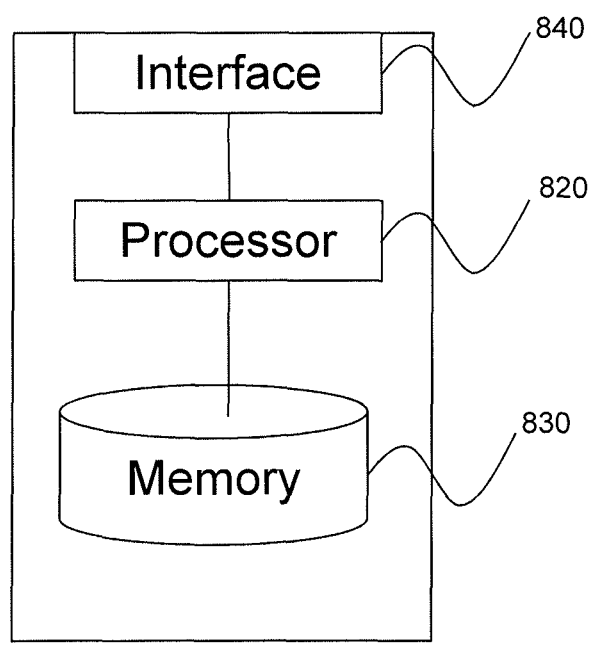

FIG. 8 is a block diagram illustrating an example of a core network node. Examples of a core network node 130 include, but are not limited to, a mobile switching center (MSC), a serving GPRS support node (SGSN), a mobility management entity (MME), a radio network controller (RNC), a base station controller (BSC), an access server (AS), and a policy charging and rules function (PCRF). Core network node 130 includes at least a processor 820, a memory 830, and a network interface 840. Processor 820 executes instructions to provide some or all of the functionality described above as being provided by core network node 130; memory 830 stores the instructions executed by processor 820; and network interface 840 communicates signals to other network nodes. The processor 820 and memory 830 can be of the same types as described supra with respect to FIG. 6A.

In some embodiments, network interface 840 is communicatively coupled to processor 820 and may refer to any suitable device operable to receive input for core network node 130, send output from core network node 130, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network. Other embodiments of core network node 130 include additional components (beyond those shown in FIG. 8) responsible for providing certain aspects of the core network node's functionality, including any of the functionality described above and/or any additional functionality (including any functionality necessary to support the solution described above).

In some embodiments, core network node 130 may include a multi-coverage parameter sending module and a multi-coverage parameter selecting module analogous to those shown in FIG. 7B. One or both modules may be implemented using one or more processors 820 of FIG. 8.

Some embodiments of the disclosure may provide one or more technical advantages. One advantage may be that, in contrast to traditional RAC techniques, certain embodiments enables the network to exercise control over the UE behavior even in PNC and ONC scenarios. Thus, D2D pairs operating under partial or no network coverage use controlled resources to maintain their D2D bearers in emergency or disaster situations. This is beneficial for the D2D pairs as well as for the network nodes because it tends to reduce interference caused by a D2D pair to other D2D pairs and to the (remaining part of) the network. A technical advantage of certain embodiments allows UEs to indicate their communication capabilities to the BS or other network nodes while the network is intact and the UEs are under network coverage. The configuration parameters received while the UEs are in coverage can be valid for D2D communication when the UEs move to PNC or ONC scenarios. This in turn allows the UEs to establish and maintain D2D communication sessions without real time network assistance. Such network configuration can make the PNC or ONC D2D communication more energy and spectrum efficient and cellular network friendly than D2D communication in PNC or ONC scenarios could be without the proposed solution. Some embodiments may benefit from some, none, or all of these advantages. Other technical advantages may be readily ascertained by one of ordinary skill in the art. A technical advantage of some embodiments Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. Modifications, additions, or omissions also may be made to the methods disclosed herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. As an example, although certain embodiments have been described in the context of long term evolution (LTE), other embodiments may use LTE-Advanced, UMTS, HSPA, GSM, cdma2000, WiMax, WiFi, and/or other suitable radio access technology or combination of radio access technologies.

In some embodiments, the network node is associated with a wireless network that operates in a licensed spectrum of radio frequencies, such as cellular frequencies. The network node may send the wireless communication device parameters indicating how the wireless communication device can use the licensed spectrum when in the INC, PNC, and/or ONC coverage scenario. As examples, the parameters may indicate for one or more of the coverage scenarios whether the wireless communication device can use the licensed spectrum for particular service types, for communicating D2D discovery signals, for communicating D2D communications, and so on.

If the wireless communication device does not have valid parameters for the current coverage scenario, the wireless communication device may fall back to an unlicensed spectrum, such as a WiFi spectrum. As an example, suppose that while in the INC coverage scenario, the wireless communication device received ONC parameters indicating how the wireless communication device can use the licensed spectrum when in the ONC coverage scenario. Suppose the wireless communication device also received a maximum timer value for the ONC parameters. If the wireless communication device moves to the ONC coverage scenario after the maximum timer value expires, thereby causing the ONC parameters to become invalid, the wireless communication device may use the unlicensed spectrum, rather than the licensed spectrum, until valid parameters can be obtained from the network.

The above description of the embodiments does not constrain this disclosure. Other changes, substitutions, and alterations are possible without departing from the scope of this disclosure, as defined by the following claims.

The invention claimed is:

1. A method in a wireless communication device capable of device-to-device (D2D) operation, the method comprising:

sending a request to receive parameters from a network node, the parameters comprising at least:

a first set of parameters indicating a configuration for use when the wireless communication device is in a first coverage scenario, wherein the first coverage scenario is one of an in-network coverage (INC) scenario, a partial network coverage (PNC) scenario, or an out-of-network coverage (ONC) scenario; and a second set of parameters indicating a configuration for use when the wireless communication device is in a second coverage scenario, the second coverage scenario is a different one of the INC scenario, PNC scenario, or ONC scenario;

receiving the first set of parameters and the second set of parameters from the network node in response to the request; and performing D2D operation in the first coverage scenario based on at least some of the parameters from the first set of parameters and in the second coverage scenario based on at least some of the parameters from the second set of parameters;

wherein the request to receive the parameters comprises requested Quality of Service (QOS) and allocation retention priority (ARP) parameters for the D2D operation for at least two types of scenarios selected from the INC scenario, the PNC scenario, and the ONC scenario.

2. The method of claim 1, wherein:
the receiving of the first and second sets of parameters occurs while the wireless communication device is in the first coverage scenario; and
the first or second set of parameters includes a maximum timer value (T1) indicating for how long the second set of parameters remains valid after the wireless communication device moves from the first coverage scenario to the second coverage scenario.

3. The method of claim 1, wherein:
the receiving of the first and second sets of parameters occurs while the wireless communication device is in the first coverage scenario; and
the first or second set of parameters includes a maximum timer value (T2) indicating for how long the second set of parameters remains valid after the wireless communication device was granted admission control.

4. The method of claim 1, wherein:
the first set of parameters includes an indication to the wireless communication device whether to use the QOS and ARP parameters requested for D2D operation in the first coverage scenario; and
the second set of parameters includes an indication to the wireless communication device whether to use the QOS and ARP parameters requested for D2D operation in the second coverage scenario.

5. The method of claim 1, wherein the first set of parameters includes one or more service types that the wireless communication device is allowed to use in the first coverage scenario and the second set of parameters includes one or more service types that the wireless communication device is allowed to use in the second coverage scenario, wherein at least one of the service types is selected from the group consisting of: national security and public safety (NSPS), relaying function, social networking, and cooperative positioning.

6. The method of claim 1, wherein the first and the second set of parameters further include one or more of:
a maximum transmit power for D2D communications;
allowed physical resources for D2D communications;
allowed subframes or time slots for D2D communications;
allowed modulation and coding scheme (MCS) schemes for D2D communications;
arbitration information for D2D communications;
D2D discovery signal configuration parameters; and
D2D communication signal configuration parameters.

7. A method in a network node for enabling admission control of a wireless communication device to access at least device-to-device (D2D) service, the method comprising:
receiving a request for parameters for use by the wireless communication device, the parameters comprising:
a first set of parameters indicating a configuration for use by the wireless communication device when the wireless communication device is in a first coverage scenario, wherein the first coverage scenario is one of an in-network coverage (INC) scenario, a partial network coverage (PNC) scenario, or an out-of-network coverage (ONC) scenario; and
a second set of parameters indicating a configuration for use by the wireless communication device when the wireless communication device is in a second coverage scenario, the second coverage scenario is a different one of the INC scenario, PNC scenario, or ONC scenario;
determining the first set and second set of parameters in response to the request; and
sending the determined first set and second set of parameters to the wireless communication device;
wherein the request for the parameters comprises requested Quality of Service (QOS) and allocation retention priority (ARP) parameters for the D2D operation for at least two types of scenarios selected from the INC scenario, the PNC scenario, and the ONC scenario.

8. The method of claim 7, wherein the first and second sets of parameters are determined based on at least one of: stored information, historical data, current radio conditions, current interference conditions, expected availability of resources over the time expected to be spent by the wireless communication device in a certain coverage scenario, expected radio conditions over the time expected to be spent by the wireless communication device in a certain coverage scenario, and expected interference conditions when the wireless communication device moves from the first coverage scenario to the second coverage scenario.

9. The method of claim 7, further comprising:
including in the first set of parameters an indication whether the wireless communication device is to use the QOS and ARP configuration requested for the first coverage scenario when performing D2D operation in the first coverage scenario; and
including in the second set of parameters an indication whether the wireless communication device is to use the QOS and ARP configuration requested for the second set of parameters when performing D2D operation in the second coverage scenario.

10. The method of claim 7, wherein the first set of parameters includes one or more service types that the wireless communication device is allowed to use in the first coverage scenario and the second set of parameters includes one or more service types that the wireless communication device is allowed to use in the second coverage scenario, wherein at least one of the service types is selected from the group consisting of: national security and public safety (NSPS), relaying function, social networking, and cooperative positioning.

11. The method of claim 7, wherein the first and the second set of parameters further include one or more of:
a maximum transmit power for D2D communications;
allowed physical resources for D2D communications;
allowed subframes or time slots for D2D communications;
allowed modulation and coding scheme (MCS) schemes for D2D communications;
arbitration information for D2D communications;
D2D discovery signal configuration parameters; and
D2D communication signal configuration parameters.

12. A wireless communication device capable of device-to-device (D2D) operation, the wireless communication device comprising:
a multi-coverage parameter receiving module operable to receive parameters from a network node, the parameters comprising at least:
a first set of parameters indicating a configuration for use when the wireless communication device is in a first coverage scenario, wherein the first coverage scenario is one of an in-network coverage (INC) scenario, a partial network coverage (PNC) scenario, or an out-of-network coverage (ONC) scenario; and
a second set of parameters indicating a configuration for use when the wireless communication device is in a second coverage scenario, the second coverage scenario is a different one of the INC scenario, PNC scenario, or ONC scenario; and a configuration module operable to configure the wireless communication device to perform D2D operation in the first coverage scenario based on at least some of the parameters from the first set of parameters and in the second coverage scenario based on at least some of the parameters from the second set of parameters;

wherein the wireless communication device receives the first set of parameters and the second set of parameters in response to sending a service request message requesting parameters for at least two of the coverage scenarios, the service request message comprising requested Quality of Service (QOS) and allocation retention priority (ARP) parameters for the D2D operation for at least two types of scenarios selected from the INC scenario, the PNC scenario, and the ONC scenario.

13. The wireless communication device of claim 12, wherein:

the wireless communication device is operable to receive the first and second sets of parameters while the wireless communication device is in the first coverage scenario; and the first or second set of parameters includes a maximum timer value (T1) indicating for how long the second set of parameters remains valid after the wireless communication device moves from the first coverage scenario to the second coverage scenario.

14. The wireless communication device of claim 12, wherein:

the wireless communication device is operable to receive the first and second sets of parameters while the wireless communication device is in the first coverage scenario; and the first or second set of parameters includes a maximum timer value (T2) indicating for how long the second set of parameters remains valid after the wireless communication device was granted admission control.

15. The wireless communication device of claim 12, wherein:

the first set of parameters includes an indication to the wireless communication device whether to use the QOS and ARP parameters requested for D2D operation in the first coverage scenario; and the second set of parameters includes an indication to the wireless communication device whether to use the QOS and ARP parameters requested for D2D operation in the second coverage scenario.

16. The wireless communication device of claim 12, wherein the first set of parameters includes one or more service types that the wireless communication device is allowed to use in the first coverage scenario and the second set of parameters includes one or more service types that the wireless communication device is allowed to use in the second coverage scenario, wherein at least one of the service types is selected from the group consisting of: national security and public safety (NSPS), relaying function, social networking, and cooperative positioning.

17. The wireless communication device of claim 12, wherein the first and the second set of parameters further include one or more of:

a maximum transmit power for D2D communications;
allowed physical resources for D2D communications;
allowed subframes or time slots for D2D communications;
allowed modulation and coding scheme (MCS) schemes for D2D communications;
arbitration information for D2D communications;
D2D discovery signal configuration parameters; and
D2D communication signal configuration parameters.

18. A network node associated with a wireless network, the network node capable of assisting a wireless communication device capable of device-to-device operation, the network node characterized by a processor comprising:

a multi-coverage parameter selecting module operable to determine parameters for use by the wireless communication device, the parameters comprising:

a first set of parameters indicating a configuration for use by the wireless communication device when the wireless communication device is in a first coverage scenario, wherein the first coverage scenario is one of an in-network coverage (INC) scenario, a partial network coverage (PNC) scenario, or an out-of-network coverage (ONC) scenario; and a second set of parameters indicating a configuration for use by the wireless communication device when the wireless communication device is in a second coverage scenario, the second coverage scenario is a different one of the INC scenario, PNC scenario, or ONC scenario; and a multi-coverage parameter sending module operable to send the determined first set and second set of parameters to the wireless communication device;

wherein the network node sends the first set of parameters and the second set of parameters in response to receiving a service request message requesting parameters for at least two of the coverage scenarios, the service request message comprising requested Quality of Service (QOS) and allocation retention priority (ARP) parameters for the D2D operation for at least two types of scenarios selected from the INC scenario, the PNC scenario, and the ONC scenario.

19. The network node of claim 18, wherein the first and second sets of parameters are determined based on at least one of: stored information, historical data, current radio conditions, current interference conditions, expected availability of resources over the time expected to be spent by the wireless communication device in a certain coverage scenario, expected radio conditions over the time expected to be spent by the wireless communication device in a certain coverage scenario, and expected interference conditions when the wireless communication device moves from the first coverage scenario to the second coverage scenario.

20. The network node of claim 18, further operable to:

include in the first set of parameters an indication whether the wireless communication device is to use the QOS and ARP configuration requested for the first coverage scenario when performing D2D operation in the first coverage scenario; and include in the second set of parameters an indication whether the wireless communication device is to use the QOS and ARP configuration requested for the second set of parameters when performing D2D operation in the second coverage scenario.

21. The network node of claim 18, wherein the first set of parameters includes one or more service types that the wireless communication device is allowed to use in the first coverage scenario and the second set of parameters includes one or more service types that the wireless communication device is allowed to use in the second coverage scenario, wherein at least one of the service types is selected from the group consisting of: national security and public safety (NSPS), relaying function, social networking, and cooperative positioning.

22. The network node of claim 18, wherein the first and the second set of parameters further include one or more of:
   a maximum transmit power for D2D communications;
   allowed physical resources for D2D communications;
   allowed subframes or time slots for D2D communications;
   allowed modulation and coding scheme (MCS) schemes for D2D communications;
arbitration information for D2D communications;
   D2D discovery signal configuration parameters; and
   D2D communication signal configuration parameters.

* * * * *